United States Patent [19]

Wasel-Nielen et al.

[11] 4,394,359

[45] Jul. 19, 1983

[54] PROCESS FOR MAKING GRANULATED CONDENSED PHOSPHATES

[75] Inventors: Horst-Dieter Wasel-Nielen; Alexander Maurer; Renate Adrian, all of Hürth, Fed. Rep. of Germany

[73] Assignee: Hoechst Aktiengesellschaft, Fed. Rep. of Germany

[21] Appl. No.: 303,425

[22] Filed: Sep. 18, 1981

[30] Foreign Application Priority Data

Sep. 23, 1980 [DE] Fed. Rep. of Germany ....... 3035805

[51] Int. Cl.³ .............................................. C01B 25/40
[52] U.S. Cl. ...................................... 423/305; 423/315
[58] Field of Search ..................... 423/305, 315; 71/34, 71/36

[56] References Cited

U.S. PATENT DOCUMENTS

| | | | |
|---|---|---|---|
| 2,419,148 | 4/1947 | King | 423/315 |
| 2,568,110 | 9/1951 | Beiley et al. | 252/135 |
| 3,233,967 | 2/1966 | Shen | 423/315 |
| 3,761,573 | 9/1973 | Hinz et al. | 423/315 |
| 3,911,086 | 10/1975 | Sheridan et al. | 423/315 |
| 3,978,195 | 8/1976 | Schrödter | 423/305 |
| 4,008,065 | 2/1977 | Hauschild | 423/315 |
| 4,009,137 | 2/1977 | Dany et al. | 260/33.4 R |

FOREIGN PATENT DOCUMENTS 664907  6/1963  Canada ................................ 423/315

*Primary Examiner*—O. R. Vertiz
*Assistant Examiner*—Wayne A. Langel
*Attorney, Agent, or Firm*—Connolly and Hutz

[57] ABSTRACT

The invention relates to a process for converting water-soluble, condensed phosphates of the following general formula (I)

$$M_2O(MPO_3)_n \qquad (I)$$

in which M stands for sodium, potassium or ammonium and n stands for a number between 4 and about 100, to granulate, wherein the pulverulent, water-soluble, condensed phosphate is thoroughly agitated and granulated in the presence of water and of a phosphate salt other than the condensed phosphate. More specifically, the condensed phosphate of general formula (I) or a mixture of the phosphate with an anhydrous or partially hydrated alkali metal phosphate is thoroughly agitated and granulated in the presence of water and an ammonium polyphosphate of the following general formula (II)

$$H_{(n-m)+2}(NH_4)_m P_n O_{3n+1} \qquad (II)$$

in which n stands for an integral average value of 3 to 1000, m stands for a whole number of up to n+2, and the m/n-ratio is between about 1.0 and 1.67.

8 Claims, No Drawings

PROCESS FOR MAKING GRANULATED CONDENSED PHOSPHATES

The present invention relates to a process for converting water-soluble, condensed phosphates of the general formula $M_2O(MPO_3)_n$ into granulate, in which M stands for sodium, potassium or ammonium and n stands for a number between 4 and about 100. The granulated material so made contains between 60.4 and 69.6% of $P_2O_5$.

It is known that water-soluble condensed phosphates of the above general formula, which are also termed melt phosphates, can be used as ingredients of detergent and cleaning compositions, such as those disclosed, for example, in European Patent Applications Nos. 79 302 058.7 and 79 302 059.5. The use of condensed alkali metal phosphates, for example, in detergent compositions has beneficial effects inasmuch as the phosphates combine in themselves a good power for sequestering lime with a good capacity for suspending or peptizing dirt, and good emulsifying properties. An adverse effect resides in the hygroscopicity of these compounds so that detergent compositions containing melt phosphates tend to coalesce during storage by absorption of moisture from air. Attempts have been made to avoid these adverse phenomena (cf. European Patent Application No. 79 302 058.7) by placing the detergent compositions in packaging material impermeable to moisture.

Further attempts to reduce the susceptibility to moisture of water-soluble melt phosphates have been described in U.S. Pat. No. 2,568,110, which provides for the melt phosphates to be granulated by thoroughly mixing an aqueous about 20 to 65 weight % solution of melt phosphate with an anhydrous hydratable substance, e.g. sodium carbonate, disodium hydrogen phosphate or pentasodium triphosphate. The resulting mixtures contain from about 5 to 45% melt phosphate, 20 to 90% anhydrous material, the balance being water of which the quantity is selected so as to have a final mixture which is in the form of a solid product. The mixing ratios indicated above show that the mixture contains relatively small proportions of melt phosphate and relatively high proportions of anhydrous material. In the event of $Na_2CO_3$ being used an anhydrous material, the mixture has a high alkalinity which seriously limits its uses in the detergent field. In the event of $Na_2CO_3$ being replaced, for example, by pentasodium triphosphate, the overall phosphate content of the mixtures is unduly increased so that they are no longer suitable ingredients for making detergent compositions of reduced phosphate content.

It is therefore an object of this invention to provide water-soluble, granulated melt phosphates with the use of fairly small proportions of granulating aids which leave the surface-active properties of the melt phosphate unaffected. It is a further object of this invention to provide abrasion-proof granulate. Granulate having the properties just described is obtained by the process of this invention.

The present invention relates more particularly to a process for converting water-soluble, condensed phosphates of the following general formula (I)

$$M_2O(MPO_3)_n \quad (I)$$

in which M stands for sodium, potassium or ammonium and n stands for a number between 4 and about 100, to granulate, wherein the pulverulent, water-soluble, condensed phosphate is thoroughly agitated and granulated in the presence of water and of a phosphate salt other than the condensed phosphate, which comprises: thoroughly agitating and granulating a condensed phosphate of the general formula (I) or a mixture of the phosphate with an anhydrous or partially hydrated alkali metal phosphate in the presence of water and an ammonium polyphosphate of the following general formula (II)

$$H_{(n-m)+2}(NH_4)_m P_n O_{3n+1} \quad (II)$$

in which n stands for an integral average value of 3 to 1000, m stands for a whole number of up to n+2, and the m/n-ratio is between about 1.0 and 1.67, the water being used in a proportion of about 0.05 to 5.0 weight %, the ammonium polyphosphate of general formula (II) being used in a proportion of about 0.003 to 1 weight %, and the alkali metal phosphate being used in a proportion of up to about 40 weight %, the percentages being all based on the quantity of the condensed phosphate of general formula (I)

A further parameter typical of the condensed phosphate of general formula (I) is its $P_2O_5$-content which varies between 60.4 and 69.6%.

The alkali metal phosphate which should preferably be used in accordance with this invention is an anhydrous or partially hydrated alkali metal triphosphate, e.g. pentasodium triphosphate, and it preferably consists to an extent of at least 50% of particles with a size of less than 0.1 mm. It is also preferable for the partially hydrated alkali metal triphosphate to be hydrated to an extent of 1 up to 15 weight %. It is also possible however to use anhydrous or partially hydrated tetrasodium diphosphate or disodium hydrogen phosphate or trisodium phosphate.

In accordance with a further preferred feature of the present process, the parameter n in the above general formula (II) stands for an integral average value of 10 to 1000 and the ratio of m/n is about 1.

In preparing the granulate of this invention, it has been found advantageous to use the granulating aids in the following proportions, which are all based on the product of formula (I). More specifically, the ammonium polyphosphate should be used in a proportion of 0.04 to 0.16 weight %, the alkali metal phosphate in a proportion of up to 25 weight %, and water in a proportion of 2 to 4 weight %.

The process for making the granulate admits of various modifications which provide:

(a) for water to be sprayed with thorough agitation on to a mixture of the condensed phosphate and ammonium polyphosphate or on to a mixture of the condensed phosphate, alkali metal phosphate and ammonium polyphosphate or (b) for an aqueous solution or suspension of the ammonium polyphosphate to be sprayed with thorough agitation on to the condensed phosphate or the mixture of the condensed phosphate and alkali metal phosphate.

A further modification of the present process provides for the granulate made from the condensed phosphate, ammonium polyphosphate and water to have an additional pulverulent alkali metal phosphate, especially alkali metal triphosphate, applied to its surface.

The present process would not have been expected to produce abrasionproof granulated melt phosphates as water has long been held in the art to be basically unsuitable for the granulation of melt phosphates. Indeed the use of water as a granulating aid has been held to effect coalescence of the melt phosphate particles and agglomeration to larger particles. Needless to say the invention is in sharp contrast with this preconception. As compared with the process disclosed in U.S. Pat. No. 2,568,110, the present invention inter alia has the beneficial effect of permitting melt phosphates to be granulated with the use of considerably smaller proportions of solid granulating aid.

The following Examples illustrate the invention which is naturally not limited thereto:

EXAMPLE 1

(Comparative Example)

10 kg of commercially available pulverulent melt phosphate which contained 68.1% $P_2O_5$ was placed in a rotating mixing drum and 0.10 kg water was sprayed thereonto in the form of a fine mist. A glutinous layer of melt phosphate which was unsuitable for use in detergent and cleaning compositions and which tenaciously adhered to the inside wall of the drum was found to have been formed within a few minutes.

EXAMPLE 2

A pulverulent mixture of 25 kg of commercially available melt phosphate, which contained 68.1% of $P_2O_5$, and 5 kg of partially hydrated sodium tripolyphosphate, which contained 0.6% of water and consisted to an extent of 70% of particles with a size of less than 0.1 mm was placed on to a rotating plate and a 4 weight % solution of ammmonium polyphosphate was sprayed thereonto within 10 minutes. The ammonium polyphosphate contained 72.5% of $P_2O_5$ and the phosphate was used in a proportion of 0.08 weight %, based on the quantity of melt phosphate. A hard and abrasionproof granulate with an average particle size of 0.5 mm was obtained. It was stored for 1 week in a thin-walled plastics bag permeable to atmospheric moisture. Only a few agglomerates which disintegrated into individual granules under minor mechanical action were found to have been formed.

EXAMPLE 3

25 kg of commercially available melt phosphate which contained 68.1% of $P_2O_5$ was placed on a rotating plate and a 3 weight % solution of ammonium polyphosphate was sprayed thereonto within 10 minutes. The ammonium polyphosphate contained 72.5% $P_2O_5$ and the phosphate was used in a proportion of 0.07 weight %, based on the quantity of melt phosphate. After all liquid matter had been added, the granulate was admixed with 5 kg of pulverulent sodium tripolyphosphate and the mixture was granulated for a further 5 minutes. The resulting granulate had the following particle size distribution:

Residue on sieve with meshes 2.0 mm wide 1.2%
Residue on sieve with meshes 1.6 mm wide 4.0%
Residue on sieve with meshes 0.8 mm wide 30.4%
Residue on sieve with meshes 0.4 mm wide 54.8%
Residue on sieve with meshes 0.2 mm wide 73.9%
Residue on sieve with meshes 0.1 mm wide 86.7%
Residue on sieve with meshes 0.05 mm wide 98.1%

The particles with a size between 0.4 and 0.8 mm were subjected to an abrasion test by the drum method. 82.8% was found to be abrasionproof. After storage for 1 week under the conditions described in Example 2, the granulate particles could not be found to have undergone coalescence.

EXAMPLE 4

25 kg of commercially available melt phosphate which contained 68.1% of $P_2O_5$ was placed on a rotating plate and a 3% aqueous solution of ammonium polyphosphate was sprayed thereonto within 7 minutes. The ammonium polyphosphate contained 72.5% of $P_2O_5$ and the phosphate was used in a proportion of 0.08 weight %, based on the quantity of melt phosphate. Hard abrasionproof granulate with an average particle size of 0.7 mm was obtained. It was stored for 3 weeks under the conditions described in Example 2. Only a few agglomerates were found to have been formed. They disintegrated into individual granules under minor mechanical action.

We claim:

1. A process for converting pulverulent, water-soluble, condensed phosphates of the following general formula (I)

$$M_2O(MPO_3)_n$$

in which M stands for sodium, potassium or ammonium and n stands for a number between 4 and about 100, to a granulate, wherein the pulverulent, water-soluble, condensed phosphate is thoroughly agitated and granulated in the presence of water and of a phosphate salt other than the condensed phosphate, which comprises: thoroughly agitating and granulating a condonsed phosphate of the general formula (I) or a mixture of the phosphate with an anhydrous or partially hydrated alkali metal phosphate in the presence of water and aiding the formation of a granulate from the pulverulent material with a granulating aid comprising an ammonium polyphosphate of the following general formula (II)

$$H_{(n-m)+2}(NH_4)_m P_n O_{3n+1}$$

in which n stands for an integral average value of 3 to 1000, m stands for a whole number of up to n+2, and the m/n-ratio is between about 1.0 and 1.67, the water being used in a proportion of about 0.05 to 5.0 weight %, the ammonium polyphosphate of general formula (II) being used in a granulation-assisting proportion of about 0.003 to 1 weight %- and the alkali metal phosphate being used in a proportion of up to about 40 weight %, the percentages being all based on the quantity of the condensed phosphate of general formula (I).

2. The process as claimed in claim 1, wherein the condensed phosphate of general formula (I) contains 60.4 to 69.6 weight % of $P_2O_5$.

3. The process as claimed in claim 1, wherein the alkali metal phosphate is an anhydrous alkali metal triphosphate or partially hydrated alkali metal triphosphate consisting to an extent of at least 50% of particles with a size of less than 0.1 mm.

4. The process as claimed in claim 3, wherein the partially hydrated alkali metal triphosphate is hydrated to an extent of 1 to 15 weight %, the balance being free from water.

5. The process as claimed in claim 1, wherein n in the general formula (II) stands for an integral average value of 10 to 1000 and the ratio of m/n is about 1.

6. The process as claimed in claim 1, wherein the ammonium polyphosphate is used in a proportion of 0.04 to 0.16 weight %, the alkali metal phosphate is used in a proportion of up to 25 weight %, and the water is used in a proportion of 2 to 4 weight %, the percentages being all based on the product of formula (I).

7. The process as claimed in claim 1, wherein the granulate is made:
(a) by spraying water with thorough agitation on to a mixture of the condensed phosphate and ammonium polyphosphate or on to a mixture of the condensed phosphate, alkali metal phosphate and ammonium polyphosphate or
(b) by spraying with thorough agitation an aqueous solution or suspension of the ammonium polyphosphate on to the condensed phosphate or mixture of the condensed phosphate and alkali metal phosphate.

8. The process as claimed in claim 1, wherein the granulate made from the condensed phosphate, ammonium polyphosphate and water has an additional pulverulent alkali metal phosphate, especially alkali metal triphosphate, applied to its surface.

* * * * *